(12) United States Patent
Ramesh Chandran et al.

(10) Patent No.: US 11,005,408 B2
(45) Date of Patent: May 11, 2021

(54) PROTECTIVE DEVICE FOR AN ELECTRIC DRIVE SYSTEM, ELECTRIC DRIVE SYSTEM, AND METHOD FOR OPERATING AN ELECTRIC DRIVE SYSTEM

(71) Applicant: Robert Bosch GmbH, Stuttgart (DE)

(72) Inventors: Aravind Ramesh Chandran, Ludwigsburg (DE); Martin Hennen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 16/464,335

(22) PCT Filed: Oct. 4, 2017

(86) PCT No.: PCT/EP2017/075201
§ 371 (c)(1),
(2) Date: May 28, 2019

(87) PCT Pub. No.: WO2018/095632
PCT Pub. Date: May 31, 2018

(65) Prior Publication Data
US 2020/0373870 A1  Nov. 26, 2020

(30) Foreign Application Priority Data

Nov. 28, 2016 (DE) ..................... 10 2016 223 539.7

(51) Int. Cl.
*H02P 29/02* (2016.01)
*H02P 29/024* (2016.01)
*H02P 101/45* (2016.01)

(52) U.S. Cl.
CPC ...... *H02P 29/0241* (2016.02); *H02P 2101/45* (2015.01)

(58) Field of Classification Search
None
See application file for complete search history.

(56) References Cited

U.S. PATENT DOCUMENTS

| 5,815,387 A * | 9/1998 | Aritsuka | H02J 3/1814 |
|---|---|---|---|
| | | | 363/54 |
| 2012/0075893 A1* | 3/2012 | Higuchi | H02H 7/1222 |
| | | | 363/37 |

(Continued)

FOREIGN PATENT DOCUMENTS

| DE | 102010053303 | 6/2012 |
|---|---|---|
| DE | 102011081173 | 2/2013 |

(Continued)

OTHER PUBLICATIONS

International Search Report for Application No. PCT/EP2017/075201 dated Dec. 21, 2017 (English Translation, 3 pages).

*Primary Examiner* — Bentsu Ro
(74) *Attorney, Agent, or Firm* — Michael Best & Friedrich LLP (57) ABSTRACT

The invention relates to the protection of an electric drive system. If a voltage spike occurs on the input of a current converter of the electric drive system via the intermediate circuit, then in order to dissipate said voltage spike in the electric drive system, a change is made to and fro between a motor operating mode and a generator operating mode in order to dissipate the electrical energy from the intermediate circuit capacitor. For the motor operating mode and the generator operating mode, in each case suitable space phasor vectors can be predefined. This permits particularly simple and rapid activation in order to dissipate the electrical energy in the electric drive system.

10 Claims, 3 Drawing Sheets

(56) References Cited

U.S. PATENT DOCUMENTS

2014/0063673 A1\* 3/2014 Kagawa ............... H02H 1/0061
                                                          361/113
2017/0214335 A1\* 7/2017 Basic ...................... H02M 7/48

FOREIGN PATENT DOCUMENTS

| DE | 202013004937 | 8/2013 |
|----|--------------|--------|
| WO | 2011085837   | 7/2011 |
| WO | 2013110482   | 8/2013 |

\* cited by examiner

Fig. 5

PROTECTIVE DEVICE FOR AN ELECTRIC DRIVE SYSTEM, ELECTRIC DRIVE SYSTEM, AND METHOD FOR OPERATING AN ELECTRIC DRIVE SYSTEM

BACKGROUND OF THE INVENTION

The present invention relates to a protective device for an electric drive system, to an electric drive system and to a method for operating an electric drive system.

Electric drives of hybrid vehicles or electric vehicles comprise an electric machine, such as for example a permanently excited synchronous machine or an asynchronous machine. The electric machine of such a drive system can be supplied with an alternating voltage by means of a pulse inverter. In this context, in the case of a fault state in the drive system, it may be necessary to set a safe state in the inverter. Such a safe state can comprise, for example, an active short circuit in which the individual phases of the electric machine are short-circuited by means of the inverter. A further safe state constitutes, for example, the free-wheeling mode. In this context, all the switching elements of the inverter are opened. A flow of current is possible here only across the free-wheeling diodes which are provided in parallel with the switching elements of the inverter.

Document DE 10 2011 081 173 A1 discloses an operating state circuit for an inverter and a method for setting operating states of an inverter. In particular, in this context there is provision to switch either into a free-wheeling state or an active short circuit as a function of a determined rotational speed of an electric machine.

SUMMARY OF THE INVENTION

The present invention discloses a protective device for an electric drive system, an electric drive system and a method for operating an electric drive system.

Accordingly the following is provided:

A protective device for an electric drive system. The electric drive system comprises a power converter. The power converter is connected on the input side to an intermediate circuit capacitor. Furthermore, the power converter is connected on the output side to an electric machine. The protective device comprises a voltage sensor and a control apparatus. The voltage sensor is configured to sense an electrical voltage across the intermediate circuit capacitor. The control apparatus is configured to make available alternately a first actuation signal for the power converter on the basis of a first space vector and a second actuation signal for the power converter on the basis of a second space vector. The first and second actuation signals are made available alternately after an electrical voltage which exceeds a first predetermined threshold value has been sensed across the intermediate circuit capacitor by the voltage sensor.

Furthermore, the following is provided:

An electric drive system having an intermediate circuit capacitor, an electric machine, a power converter and a protective device according to the invention. The power converter is electrically coupled on the input side to the intermediate circuit capacitor. Furthermore, the power converter is coupled on the output side to the electric machine.

In addition, the following is provided:

A method for operating an electric drive system. The electric drive system comprises a power converter. The power converter is connected on the input side to an intermediate circuit capacitor. Furthermore, the power converter is connected on the output side to an electric machine. The method comprises a step for sensing an electrical voltage across the intermediate circuit capacitor. Furthermore, the method comprises steps for actuating the power converter alternately on the basis of a first space vector and a second space vector after the sensed electrical voltage across the intermediate circuit capacitor has undershot a predetermined first threshold value.

The steps of actuating the power converter on the basis of the first space vector and of actuating the power converter on the basis of the second space vector can, in particular, be repeated until a predetermined abort condition is met. For example, this abort condition can comprise the undershooting of an electrical current or the undershooting of a predetermined electrical voltage in the electric drive system.

The present invention is based on the realization that at the transition into a safe operating state, such as for example into an active short circuit or into a free-wheeling state, large loads can occur in an electric drive system with a rotating electric machine. Therefore, for example at a changeover into the active short circuit, high electrical currents can occur which are output by the electric machine. In addition, when a free-wheeling operating mode is set, high voltages can occur which can charge an intermediate circuit capacitor via the free-wheeling diodes in the inverter of the drive system. If this electrical energy which is fed into the intermediate circuit capacitor cannot be eliminated, because, for example, a connected battery has been disconnected from the drive system, high voltages occur across the intermediate circuit capacitor and can cause components in the electric drive system to be damaged or, under certain circumstances, destroyed.

The present invention is therefore based on the concept of allowing for this realization and of making available protection for an electric drive system. As a result, the electrical energy in the drive system can be eliminated without high electrical currents or voltages which can cause components in the electric drive system to be damaged or destroyed occurring in the process. For this purpose there is provision to monitor the electrical voltage across the intermediate circuit capacitor. If the electrical voltage across the intermediate circuit capacitor exceeds a predefined limiting value, in response switching occurs in the electric drive system to and fro between a motor operating state and a generator operating state until the energy in the electric drive system has been reduced to such an extent that dangerously high voltages and/or currents can no longer occur.

The actuation of the power converter in the electric drive system can be carried out, for example, by using what are referred to as space vectors. By means of predefined space vectors it is possible to implement in this context what is referred to as space vector modulation (SVM). By means of space vector modulation it is possible to actuate a connected electric machine on the basis of pulse width modulation. In particular, the power converter of the electric drive system can therefore be a power converter which carries out, by means of space vector modulation, a corresponding pulse width modulation in order to make available the alternating voltage for the connected electric machine.

Since the reduction in the electrical energy in the electric drive system is also carried out on the basis of predefined space vectors, particularly simple actuation can be implemented when there is an increase in voltage at the intermediate circuit. It is possible to switch particularly easily to and fro between the motor operating mode and the generator operating mode by means of suitable space vectors. Rapid switching between these two operating modes can permit a reliable reduction of the energy owing to the losses in the components of the drive system, without in the process high voltages and/or currents occurring which could cause damage to components.

The respective switching between the motor operating mode and the generator operating mode in the drive system in order to reduce the electrical energy takes place here on the basis of the electrical voltage across the intermediate circuit capacitor. Monitoring the intermediate circuit voltage permits an excessive increase in the intermediate circuit voltage to a dangerous level to be reliably prevented. Furthermore, the monitoring of the intermediate circuit voltage offers a very simple and efficient initial basis for the actuation according to the invention.

The intermediate circuit voltage can also be monitored, and the necessary space vectors specified, in particular outside the conventional closed-loop control of the power converter. In this way, the actuation for protecting the electric drive system can be carried out independently of the closed-loop control of the power converter. As a result, the protection of the electric drive system is ensured even if the closed-loop control of the power converter has a fault.

Alternatively, the predefinition for the implementation of the power converter can also be based on the predefined space vectors within the closed-loop control of the power inverter. This permits a particularly complex and cost-effective design for protecting the electric drive system.

According to one embodiment, the control apparatus of the protective device is configured to make available the first control signal for a predetermined first time period and the second control signal for a predetermined second time period. The first and second predefined time periods can be specified, for example as fixed values or as a ratio between the first and second time periods. In this way, switching between a motor operating mode and a generator operating mode can be brought about very easily.

According to one embodiment, the control apparatus is configured to make available the first control signal after the electrical voltage across the intermediate circuit capacitor exceeds the first predetermined threshold value, and to make available the second control signal after the electrical voltage across the intermediate circuit capacitor undershoots a second predetermined threshold value. As a result, a switching between the motor operating mode and generator operating mode can take place at a suitable time in each case.

According to one embodiment, the control apparatus of the protective device for the electric drive system is configured to adapt the predetermined first threshold value and/or the predetermined second threshold value. In particular, the first and/or second threshold values can be adapted after it has been detected for the first time by the voltage detector that the electrical voltage across the intermediate circuit capacitor has exceeded a first initial predetermined threshold value. In this way, in particular after the first predetermined threshold value has been exceeded for the first time and the energy reduction initiated in response thereto, the first predetermined threshold value and the second predetermined threshold value are subsequently lowered. In particular, the first and/or second predetermined threshold values can be lowered until a predefined abort criterion has been reached. Such an abort criterion can comprise, for example, undershooting of an electrical voltage and/or undershooting of an electrical current within the electric drive system. In this way, by virtue of the switching between the generator operating mode and the motor operating mode at the electric drive system, the voltage across the intermediate circuit capacitor can be gradually lowered until a predefined abort criterion has been reached.

According to one embodiment, the control apparatus is configured to select the first space vector and/or the second space vector from a set of predetermined space vectors. The predefinition of the space vectors permits a particularly simple and reliable selection of the space vectors independently of the rotational frequency of the electric machine. In particular, the first space vector and/or the second space vector can be determined on the basis of a predefined table or a predefined logic combination. The space vectors can be determined here, in particular, on the basis of the present current vectors in the electric drive system, that is to say the current vectors in the phases between the power converter and the electric machine.

According to one embodiment, the control device is configured to set a safe operating mode in the power converter after a predefined abort condition has been detected in the electric drive system. A safe operating mode can comprise, for example, a free-wheeling operating mode or an active short circuit. The abort condition can comprise, for example, the undershooting of an electrical current in the phases between the power converter and electric machine. In particular, the abort criterion can comprise the undershooting of the sum of the absolute values of all the phase currents. Furthermore, the abort criterion can comprise, in particular, the undershooting of an electrical voltage, in particular of an electrical voltage across the intermediate circuit capacitor.

According to one embodiment of the electric drive system, the drive system comprises an isolating switch. The isolating switch is coupled on the output side to the intermediate circuit capacitor. Furthermore, the isolating switch can be connected on the input side to a source of electrical energy, for example a battery. Such an isolating switch can consequently interrupt an electrical connection between the source of energy and the intermediate circuit capacitor. After such an interruption, it is no longer possible to continue to discharge, in the direction of the source of energy, for example the battery, electrical energy which is fed in to the intermediate circuit capacitor from the electric machine in the generator operating mode. In this case, the control apparatus can be configured to make available the first actuation signal and the second actuation signal for the power converter if an electrical connection between the intermediate circuit capacitor and a connected source of energy is interrupted. This interruption can be detected, for example, on the basis of a switched state of the isolating switch.

According to one embodiment of the electric drive system, the electric machine comprises an induction machine. For example, the electric machine can comprise an asynchronous machine. Alternatively, the electric machine of the electric drive system can also comprise a synchronous machine, in particular a permanently excited synchronous machine.

According to one embodiment of the method for operating an electric drive system, the method comprises a step for adapting the first predetermined threshold value and/or, if appropriate, the second predetermined threshold value. In particular, the adaptation of the first predetermined threshold value and/or of the second predetermined threshold value can take place during the actuation of the power converter on the basis of the first space vector and/or the second space vector.

According to one embodiment, the method comprises a step for determining at least one first space vector. The first space vector which is determined in this way is configured here to actuate the electric machine in a motor operating mode. For example, a space vector which is as far as possible opposed to the present current vector can be determined as a first space vector.

According to one embodiment, the method comprises a step for determining at least one second space vector. The second space vector is configured here to actuate the electric machine in a generator operating mode. In this generator operating mode, the intermediate circuit capacitor in the electric drive system is therefore charged. In particular, a space vector which runs in advance of the present power vector can be selected as a second space vector.

The above configurations and developments can, where appropriate, be combined with one another as desired. Further refinements, developments and implementations of the invention also comprise combinations, which are not explicitly specified, of features of the invention which have been described above or are described below with respect to the exemplary embodiments. In particular, the person skilled in the art will also add individual aspects here as improvements or additions to the respective basic forms of the present invention.

BRIEF DESCRIPTION OF THE DRAWINGS

The present invention will be explained in more detail below on the basis of the exemplary embodiment specified in the schematic figures of the drawings, in which.

DETAILED DESCRIPTION

Figure 1:
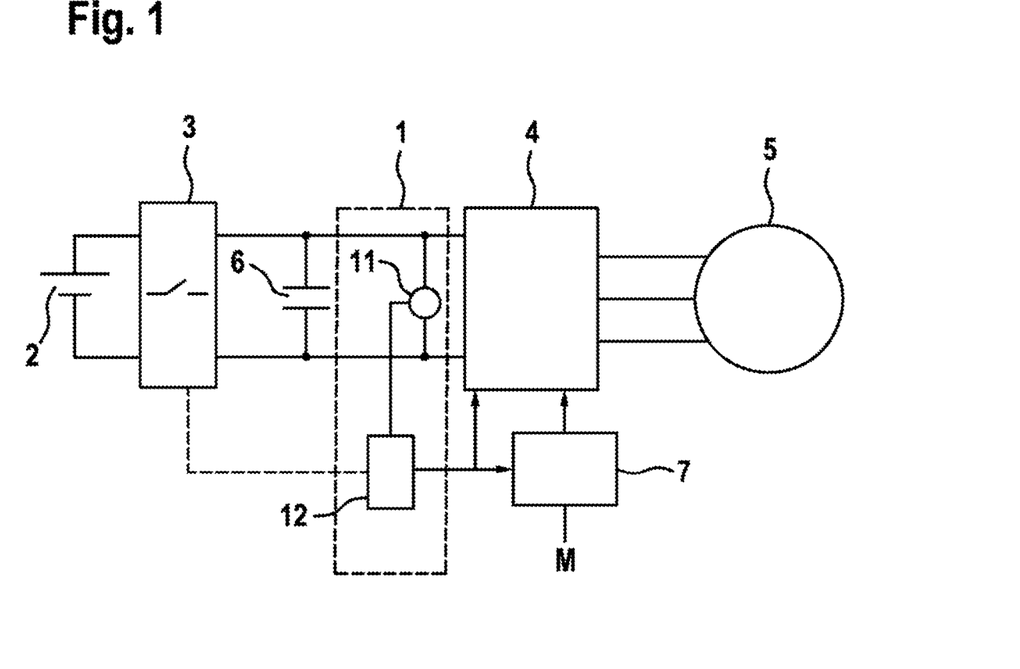
FIG. 1: shows a schematic illustration of an electric drive system having a protective device according to one embodiment.

FIG. 1 shows a schematic illustration of an electric drive system according to one embodiment. The electric drive system comprises an electric machine 5 which is electrically coupled to a power converter 4. The electric machine 5 can be, for example, an induction machine. In particular, the electric machine 5 can be a synchronous machine such as, for example, a permanently excited synchronous machine. Alternatively, for example an asynchronous machine is also possible as an electric machine 5. The number, illustrated here, of three phases of the electric machine 5 serves here merely for better understanding. Furthermore, the electric machine 5 can also have any other desired number of phases, for example six phases.

The power inverter 4 can be fed on the input side by an electrical energy source 2, for example a direct voltage source, such as, for example, a traction battery of an electric vehicle or hybrid vehicle. In this context, for example an isolating switch 3 can be provided between the electrical energy source 2 and the power inverter 4. The electrical connection between the electrical energy source 2 and the power converter 4 can be closed or interrupted by means of the isolating switch 3. In particular in the event of a fault situation, the electrical connection between the electrical energy source 2 and the power converter 4 can be interrupted, for example by means of the isolating switch 3, with the result that in the event of a fault no further electrical energy can be fed into the power converter 4 from the electrical energy source 2. The isolating switch 3 can, in particular, also comprise, for example, an overcurrent protection device or the like.

In order to stabilize the direct voltage made available on the input side on the power converter 4, an intermediate circuit capacitor 6 can be provided at the input of the power converter 4. The intermediate circuit capacitor 6 is located, for example, between the isolating switch 3 and the input of the power converter 4.

In a motor operating mode, a direct voltage is made available by the electrical energy source 2 at the input of the power converter 4 in the electric drive system. The power converter 4 converts this direct voltage into a suitable further voltage and makes available this converted voltage at the electric machine 5. For example, the power converter 4 can convert the direct voltage into a single-phase or multi-phase alternating voltage, in order as a result to set a predefined torque M or some other setpoint value predefinition at the electric machine 5. For this purpose, for example the torque M which is to be set or a further setpoint value predefinition can be made available at a closed-loop control device 7. The closed-loop control device 7 subsequently determines the necessary actuation signals for actuating the power converter 4, on the basis of the torque M or the setpoint value predefinition and, if appropriate, further parameters of the electric drive system.

The power converter 4 can be, for example, a power converter with what is referred to as a B6 bridge. The power converter 4 can have, for example for each phase of the electric machine 5, an upper semiconductor switch and a lower semiconductor switch. In this context, in each case an upper semiconductor switch is provided between the terminal of the positive input voltage and a phase terminal of the electric machine 5. Moreover, in each case a lower semiconductor switch is provided between the terminal of the negative input voltage and a phase terminal of the electric machine 5. Moreover, what is referred to as a free-wheeling diode can be provided in parallel with each semiconductor switch. The closed-loop control device 7 subsequently determines the suitable actuation signals for the respective semiconductor switches in the power converter 4 for the operation of the electric machine 5, on the basis of the torque M or the setpoint value predefinition.

The actuation signals for the semiconductor switches in the power converter 4 can be determined here, for example, by means of what is referred to as a space vector modulation. In particular, in this context, it is possible to make use of conventional and known methods which carry out pulse width modulation on the basis of predefined space vectors.

Moreover, the electric drive system can also be operated in a generator operating mode. In this context, the rotational energy of the electric machine 5 can be converted into electrical energy. The electrical energy from the electric machine 5 is subsequently fed into the power converter 4 which converts the alternating voltage from the electric machine 5 into a direct voltage and makes available the rectified voltage at the electrical energy source 2.

If the electrical connection between the electrical energy source 2 and the power converter 4 is interrupted while the electric drive system is operating, the electric machine 5 will subsequently output, as a generator, an electrical voltage to the phase terminals. If the upper or lower switching elements in the power converter 4 are subsequently closed (for example in order to set an active short circuit), high transient and steady-state electrical currents flow in the phase terminals via the switching elements of the power converter 4. This can, under certain circumstances, cause components in the power converter 4 to be damaged or destroyed. If the switching elements of the power converter 4 are, on the other hand, opened (for example in order to set a free-wheeling mode), the electrical energy from the electric machine 5 can flow via the free-wheeling diode parallel to the switching elements in the power converter 4 into the intermediate circuit capacitor 6 at the input of the power converter 4 and subsequently charge the intermediate circuit capacitor 6. Since the electrical connection between the electrical energy source 2 and the input of the power converter 4 with the intermediate circuit capacitor 6 is, however, interrupted, the electrical energy cannot be discharged from the intermediate circuit capacitor 6. Therefore, the electrical voltage across the intermediate circuit capacitor 6 will rise very quickly. This rapid rise in voltage can, under certain circumstances, cause components in the electric drive system, in particular the power converter 4, to be damaged or destroyed.

In order to avoid high voltage peaks at the intermediate circuit capacitor 6, the electrical voltage across the intermediate circuit capacitor 6 is monitored by a voltage sensor 11 of the protective device 1. If an electrical voltage which exceeds a predefined initial upper limiting value is detected by the voltage sensor 11, a motor operating mode is set in the power converter 4 by the control apparatus 12 of the protective device 1. A motor operating mode is to be understood here as meaning an operating mode in which the power converter 4 feeds electrical energy into the electric machine 5. This electrical energy which is fed into the electric machine 5 is extracted from the intermediate circuit capacitor 6 here. As a result, the electrical voltage across the intermediate circuit capacitor 6 subsequently drops.

If the voltage sensor 11 of the protective device 1 subsequently detects that the electrical voltage across the intermediate circuit capacitor 6 undershoots an initial lower limiting value, this motor operating mode is ended and a generator operating mode is set in the power converter 4. In this context, the term generator operating mode is to be understood as meaning an operating mode in which the electric machine 5 operates as a generator and at the same time energy from the rotation of the electric machine 5 is converted into electrical energy. The electrical energy is converted here by the power converter 4 into a direct voltage and in turn fed into the intermediate circuit capacitor 6. As a result, the electrical voltage across the intermediate circuit capacitor 6 will subsequently rise again.

Alternatively it is also possible to provide respectively predefined time periods for the motor operating mode and the generator operating mode. For example, firstly a motor operating mode can be set for a first predefined time period. After the expiry of the first time period, a generator operating mode can subsequently be set for a predefined second time period. For this purpose, for example the first time period and the second time period can be predefined as fixed time periods. Alternatively it is also possible to predefine a (relative) ratio between the first time period and the second time period. If in this context either the first time period or the second time period varies on the basis of further system parameters, the respective other time period is also subsequently adapted on the basis of the predefined ratio. In this context it is also possible to vary the predefinition for the ratio between the two time periods or the specifically predefined first and second time periods. For example, the first and the second time period or the ratio between the two time periods can be adapted taking into account the voltage profile across the intermediate circuit capacitor 6 or further system parameters.

The switching between the motor operating mode and the generating operator mode can be repeated here as often as desired. Owing to the electrical losses in the components, in particular in the power converter 4, electrical energy is converted into heat here. Therefore, the rotational energy of the electric machine 5 can be gradually converted into thermal energy. As a result of the controlled switching between the generator operating mode and motor operating mode it is possible to ensure here that the electrical voltages and currents in the electric drive system are always below the predefined limiting values and therefore no damage is caused to the components in the electric drive system.

Figure 2:
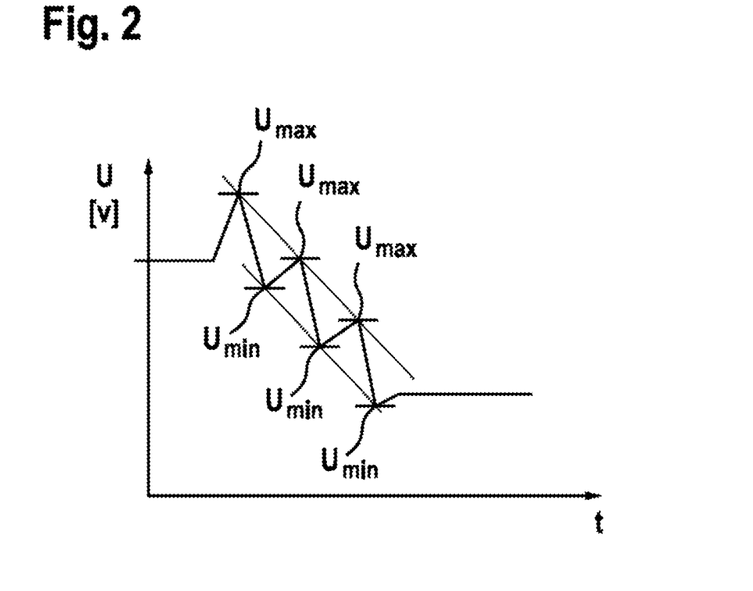
FIG. 2: shows a schematic illustration of a voltage/time diagram for a profile of the intermediate circuit voltage according to one embodiment.

FIG. 2 shows a schematic illustration of a voltage/time diagram for the voltage profile across the intermediate circuit capacitor 6 according to one embodiment.

The upper limiting value Umax for the voltage detected across the intermediate circuit capacitor 6 by the voltage sensor 11, at the exceeding of which by the control apparatus 12 of the protective device 1 a motor operating mode is set, can be modified here during operation, particularly after the initial upper limiting value is first exceeded. For example, the upper limiting value Umax for the electrical voltage across the intermediate circuit capacitor 6 can be gradually lowered after the first response. Analogously, the lower limiting value Umin, at the undershooting of which switching is performed from the motor operating mode into the generator operating mode, is also modified, in particular lowered. For this purpose, any desired methods for adapting, in particular for lowering the upper limiting value Umax and the lower limiting value Umin are possible. For example, the adaptation can be defined as a function over the time, a function over the phase currents in the phases between the power converter 4 and the electric machine 5 or as a function of any other desired parameter. In addition, it is also possible to lower the respective limiting values by a predefined value whenever the upper limiting value Umax or the lower limiting value Umin is exceeded or undershot, respectively. Furthermore, any further desired methods for adapting the upper and lower limiting value Umax and Umin are also possible.

Switching between the generator operating mode and the motor operating mode can be carried out here until a predefined abort criterion is met. For example the reaching of a predefined minimum voltage across the intermediate circuit capacitor 6 can be an abort criterion. For example, the switching between the generator operating mode and the motor operating mode can be carried out until a predefined voltage of, for example, 60 volts, 45 volts, 30 volts or any other desired value is reached. In addition, it is also possible to evaluate, as an abort criterion, a further electrical variable, for example the electrical phase currents in the phases between the power converter 4 and the electric machine 5. It is therefore possible, for example, to carry out the switching between the generator operating mode and the motor operating mode until the sum of the phase currents has undershot a predefined minimum current limiting value.

The setting of the generator operating mode or of the motor operating mode in the power converter 4 can also be carried out, in a way analogous to the conventional actuation of the electric drive system, on the basis of predefined space vectors. It is therefore possible, for example, to determine in each case for the actuation a space vector for the generator operating mode and a space vector for the motor operating mode. The determination of the space vectors which are suitable for this is possible here by means of any desired suitable methods. In particular, the space vectors can be determined, for example, from the electrical currents (phase currents) between the power converter 4 and the phase terminals of the connected electric machine 5. For this purpose, the signs of the individual phase currents can be evaluated and/or the magnitude of the individual phase currents can be compared with one another.

Figure 3:
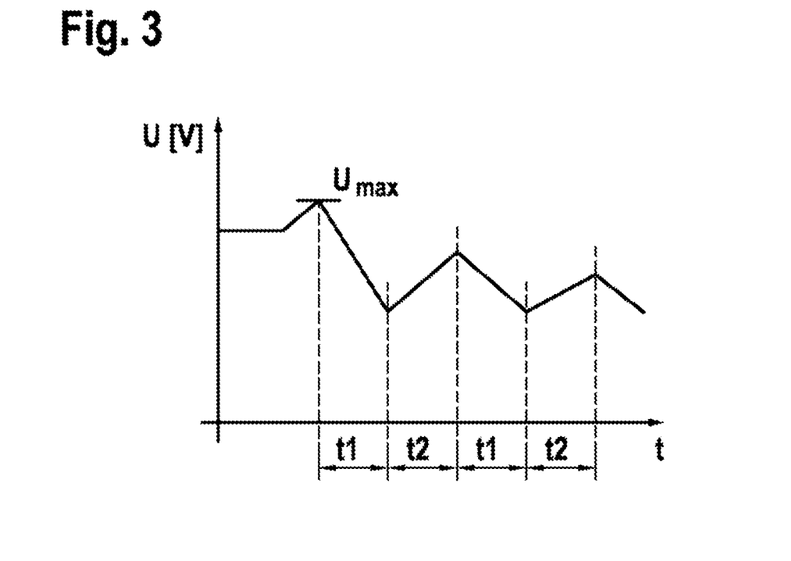
FIG. 3: shows a schematic illustration of a voltage/time diagram for a profile of the intermediate circuit voltage according to a further embodiment.

FIG. 3 shows a schematic illustration of an alternative actuation of the power converter 4 according to an exemplary embodiment. Here, the power converter 4 is firstly actuated for a first predetermined time period t1 on the basis of a first space vector, and is subsequently actuated for a second predetermined time period t2 on the basis of a second space vector. The first time period t1 and the second time period t2 can be fixedly predefined here. Alternatively, the first and the second time periods can also be adapted on the basis of the voltage profile at the intermediate circuit capacitor 6 or other system parameters. In particular, it is also possible to predefine or set a ratio between the first time period t1 and the second time period t2.

Figure 4:
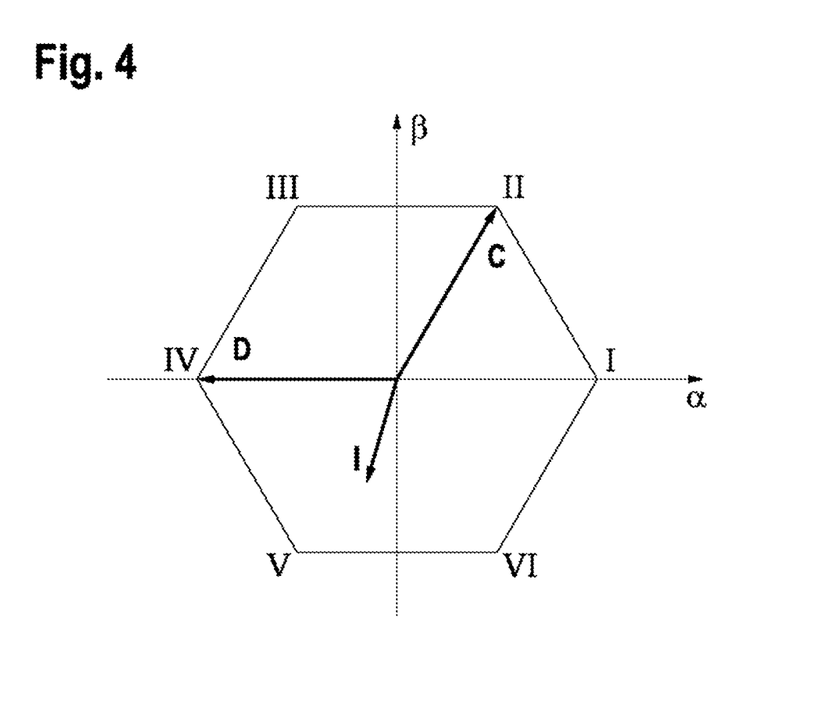
FIG. 4: shows a schematic illustration explaining the selection of the space vectors according to one embodiment.

FIG. 4 shows a schematic illustration for determining the space parameters according to one embodiment. The space parameters can be determined, for example, in a stator-fixed α-β coordinate system. The possible space parameters are characterized by I to VI. The present current vector is indicated by the reference symbol I. In this context, a vector D which is denoted as a "discharge vector" can be selected as a space vector for discharging the intermediate circuit capacitor 6 in the motor operating mode, said vector D being opposite the present current vector by as far as possible precisely 180°. In order to charge the intermediate circuit capacitor 6 in a generator operating mode, for example a space vector C can be selected, which space vector C can be denoted as what is referred to as a "charging vector" and moves in advance of the present current vector by a vector. For the selection of a suitable space vector it may for this purpose be, for example, sufficient in each case to consider the sector in which the present current vector is located.

The protective device 1 of the electric drive system can be integrated here, for example, into the control apparatus 7 for generating the actuation signals of the switching elements in the power converter 4.

In an alternative embodiment, the protective device 1 for the electric drive system can also be embodied separately from the control apparatus 7. In this context, the sensing of the electrical currents across the intermediate circuit capacitor 6 is carried out by means of the voltage sensor 11, and the generation of the actuation signals in the control apparatus 12 is carried out independently of the control apparatus 7. In this way, on the one hand it is possible to ensure that the protection of the electric drive system is ensured even if a fault occurs in the control apparatus 7. Furthermore, a separate protection device 1 permits particularly rapid response, with the result that when the electrical voltage across the intermediate circuit capacitor 6 increases excessively the protection device 1 can respond particularly quickly. For this purpose, the protection device 1 and, in particular, the control apparatus 12 can be implemented, for example, by means of a relatively simple circuit. For example, the protection device 1 and, in particular, the control apparatus 12 can be implemented by means of programmable logic circuits (PLC). In this context, in particular the space vectors which are to be selected for the generator operating mode and the motor operating mode can be suitably stored as a computational rule or in the form of a table. In this way, a very rapid response of the protection device 1 can be achieved.

Figure 5:
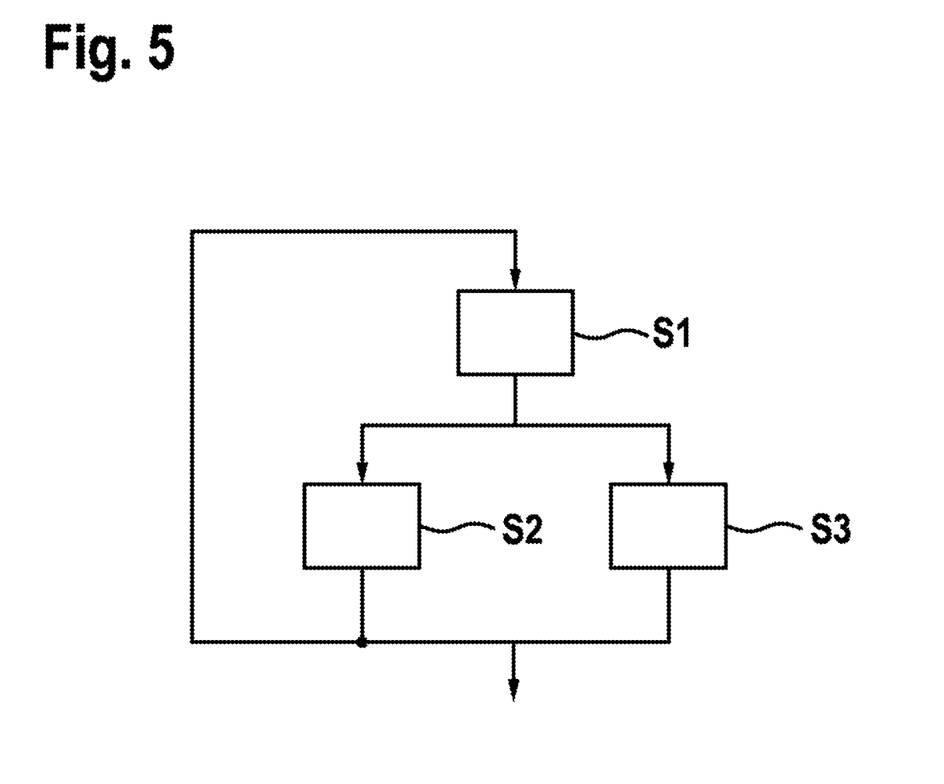
FIG. 5: shows a schematic illustration of a flowchart, as is used for the basis of the method according to one embodiment.

FIG. 5 shows a schematic illustration of a flowchart such as is used as the basis for a method for operating an electric drive system according to one embodiment. The electric drive system for this method can be, in particular, the electric drive system which is described above and is composed of an electric machine 5, power converter 4, intermediate circuit capacitor 6 and electrical energy store 2. In step S1, an electrical voltage across the intermediate circuit capacitor 6 is sensed. In step S2, the power converter 4 is actuated on the basis of a first space vector after the sensed electrical voltage across the intermediate circuit capacitor 6 has exceeded a predetermined first threshold value Umax. This actuation takes place until the sensed electrical voltage across the intermediate circuit capacitor 6 has undershot a predetermined second threshold value Umin. Subsequently, in step S3 the power converter 4 can be actuated on the basis of a second space vector. The first space vector can be here, as already described above, a space vector which sets a motor operating mode in the electric drive system. Analogously, the second space vector can be a space vector which sets a generator operating mode in the electric drive system.

Alternatively it is also possible to actuate the power converter 4 in each case for predetermined time periods alternately in step S2 on the basis of a first space vector, and to actuate said power converter 4 in step S3 on the basis of a second space vector.

Steps S2 and S3 for actuating the power converter on the basis of the first space vector or the second space vector, respectively, can be repeated alternately here until a predefined abort criterion is satisfied.

As already described above, the first threshold value for the setting of the motor operating mode can be adapted and, in particular, lowered on the basis of the first space vector, and/or the second threshold value for the setting of the generator operating mode can be adapted and, in particular, lowered on the basis of the second space vector, during the actuation of the power converter in steps S2 and S3.

As a result of the alternating actuation, described above, in the motor operating mode and the generator operating mode, respectively, the energy stored in the electric drive system can be gradually converted into thermal energy. In this way, on the one hand, the rotational energy of the electric machine 5 can be reduced. In addition, in this way it is also possible to discharge a possibly charged intermediate circuit capacitor 6 until the voltage across the intermediate circuit capacitor 6 has reached a non-hazardous voltage level.

After the electrical energy in the electric drive system has been reduced by the previously described switching between the generator operating mode and motor operating mode, to such an extent that a predefined abort criterion has been satisfied, what is referred to as a safe operating mode can subsequently be set in the electric drive system. This safe operating mode can be, for example, what is referred to as a free-wheeling mode. In this free-wheeling mode, all of the switching elements in the power converter 4 are opened. Alternatively, what is referred to as an active short circuit, in which either the upper switching elements or the lower switching elements of the power converter 4 are closed so that the phase terminals of the electric machine 5 are short-circuited, is also possible as a safe operating mode.

In summary, the present invention relates to protection of an electric drive system. If an excessive increase in voltage occurs at the input of a power converter of the electric drive system via the intermediate circuit, in order to reduce this excessive increase in voltage in the electric drive system switching to and fro is performed between a motor operating mode and a generator operating mode in order to reduce the electrical energy of the intermediate circuit capacitor. Respectively suitable space vectors can be predefined for the motor operating mode and the generator operating mode. This permits particularly simple and rapid actuation in order to reduce the electrical energy in the electric drive system.

The invention claimed is:

1. A protective device (1) for an electric drive system that includes a power converter (4) connected on an input side to an intermediate circuit capacitor (6), and connected on an output side to an electric machine (5), the protective device (1) comprising:
    a voltage sensor (11) configured to sense an electrical voltage across the intermediate circuit capacitor (6); and
    a control apparatus (12) configured to make available alternately a first actuation signal for the power converter (4) on the basis of a first space vector and a second actuation signal for the power converter (4) on the basis of a second space vector, after an electrical voltage which exceeds a first predetermined threshold value (Umax) has been sensed across the intermediate circuit capacitor (6) by the voltage sensor (11),
    wherein the first actuation signal is configured to actuate the electric machine (5) in a motor operating mode.

2. The protective device (1) as claimed in claim 1, wherein the control apparatus (12) is configured to make available the first control signal for a predetermined first time period and the second control signal for a predetermined second time period.

3. The protective device (1) as claimed in claim 1, wherein the control apparatus (12) is configured to make available the first control signal after the electrical voltage across the intermediate circuit capacitor (6) exceeds the first predetermined threshold value, and to make available the second control signal after the electrical voltage across the intermediate circuit capacitor (6) undershoots a second predetermined threshold value (Umin).

4. The protective device (1) as claimed in claim 1, wherein the control apparatus (12) is configured to adapt the first predetermined threshold value (Umax) adapt the second predetermined threshold value (Umin), or adapt both the first and second predetermined threshold values.

5. The protective device (1) as claimed in claim 1, wherein the control apparatus (12) is configured to select the first space vector, select the second space vector, or select both the first space vector and the second space vector from a set of predetermined space vectors.

6. The protective device (11) as claimed in claim 1, wherein the control apparatus (12) is configured to set a free wheeling operating mode or an active short circuit in the power converter if an electrical current between the power converter and the electric machine undershoots a predetermined limiting value.

7. An electric drive system having:
    an intermediate circuit capacitor (6);
    an electric machine (5);
    a power converter (4) which is electrically coupled on the input side to the intermediate circuit capacitor (6), and which is electrically coupled on the output side to the electric machine (5); and a protective device (1) having
    a voltage sensor (11) configured to sense an electrical voltage across the intermediate circuit capacitor (6); and
    a control apparatus (12) configured to make available alternately a first actuation signal for the power converter (4) on the basis of a first space vector and a second actuation signal for the power converter (4) on the basis of a second space vector, after an electrical voltage which exceeds a first predetermined threshold value (Umax) has been sensed across the intermediate circuit capacitor (6) by the voltage sensor (11),
    wherein the first actuation signal is configured to actuate the electric machine (5) in a motor operating mode.

8. The electric drive system as claimed in claim 7, having an isolating switch (3) which is electrically coupled on the output side to the intermediate circuit capacitor (6), and which can be connected on the input side to an electrical energy source (2).

9. A method for operating an electric drive system which comprises a power converter (4) which is connected on the input side to an intermediate circuit capacitor (6), and is connected on the output side to an electric machine (5), having the steps:
    sensing (S1) an electrical voltage across the intermediate circuit capacitor (6);
    determining a first space vector, wherein the first space vector is configured to actuate the electric machine (5) in a motor operating mode; and
    actuating (S2, S3) the power converter (4) alternately on the basis of the first space vector and on the basis of a second space vector after the sensed electrical voltage across the intermediate circuit capacitor (6) has exceeded the predetermined first threshold value (Umax).

10. The method as claimed in claim 9, having a step for determining a second space vector, wherein the second space vector is configured to actuate the electric machine (5) in a generator operating mode.

* * * * *